United States Patent
Toki

[19]

[11] Patent Number: 6,091,830
[45] Date of Patent: Jul. 18, 2000

[54] TRANSMITTER STRUCTURE FOR LIMITING THE EFFECTS OF WIND NOISE ON A MICROPHONE

[75] Inventor: Nozomi Toki, Tokyo, Japan

[73] Assignee: NEC Corporation, Tokyo, Japan

[21] Appl. No.: 08/867,997

[22] Filed: Jun. 3, 1997

[30] Foreign Application Priority Data

Jul. 19, 1996 [JP] Japan ..................................... 8-190598

[51] Int. Cl.$^7$ .................................................. H04R 25/00
[52] U.S. Cl. ........................... 381/359; 381/357; 381/356
[58] Field of Search .................................... 381/359, 360, 381/355, 356, 357, 188

[56] References Cited

U.S. PATENT DOCUMENTS

| 2,560,354 | 7/1951 | Kettler ...................................... 381/357 |
| 4,151,378 | 4/1979 | Watson . |
| 4,975,966 | 12/1990 | Sapiejewski ............................. 381/359 |
| 5,282,245 | 1/1994 | Anderson ................................. 379/433 |
| 5,442,713 | 8/1995 | Patel et al. ............................... 381/168 |
| 5,701,354 | 12/1997 | Komoda et al. ......................... 381/157 |
| 5,703,957 | 3/1997 | McAteer .................................... 381/92 |
| 5,781,643 | 7/1998 | Anderson ................................. 381/168 |
| 5,859,916 | 1/1999 | Ball et al. ................................. 381/326 |
| 5,905,803 | 3/1997 | Dou et al. ................................. 381/359 |

FOREIGN PATENT DOCUMENTS

| 0 661 902 A2 | 7/1995 | European Pat. Off. . |
| 0 707 403 A2 | 4/1996 | European Pat. Off. . |
| 6-269084 | 9/1994 | Japan . |
| 6-73991 | 10/1994 | Japan . |
| 7-20742 | 4/1995 | Japan . |
| 7-99536 | 4/1995 | Japan . |
| 7-202997 | 8/1995 | Japan . |
| 2 064 267 | 6/1981 | United Kingdom . |
| WO 94/06256 | 3/1994 | WIPO . |

*Primary Examiner*—Curtis A. Kuntz
*Assistant Examiner*—Dionne N. Harvey
*Attorney, Agent, or Firm*—Scully, Scott, Murphy & Presser

[57] ABSTRACT

A transmitter structure which is resistance to wind noise and the like and allows a reduction in size is disclosed. A sound hole is formed in a case at an offset position with respect to a microphone, and a slit extending from the sound hole to the microphone is filled with an acoustic resistance cloth.

4 Claims, 2 Drawing Sheets

TRANSMITTER STRUCTURE FOR LIMITING THE EFFECTS OF WIND NOISE ON A MICROPHONE

BACKGROUND OF THE INVENTION

1. Field of the Invention

The present invention relates to a transmitter structure and, more particularly, to the transmitter structure of a portable electronic device, e.g., a portable telephone or a video camera, which is used outdoors and designed to reduce wind noise.

2. Description of the Prior Art

Various transmitter structures designed to reduce noise caused by user's breath and wind in outdoor use have been proposed.

For example, Japanese Unexamined Patent Publication No. 6-269084 discloses a technique of controlling the cutoff frequency of a high-pass filter for reducing wind noise by using a detection means for detecting wind on the basis of differential outputs from two microphones.

In another transmitter structure disclosed in Japanese Unexamined Patent Publication No. 7-202997, the sound hole formed in the case is connected to the microphone through a sound path to prevent breath from directly entering the microphone.

Since the above conventional transmitter structure has a filter for reducing wind noise and a wind detection circuit, a reduction in cost is difficult to attain.

In addition, since two microphones are used, it is difficult for this structure to realize a compact electronic device for which portability is required, in particular.

Furthermore, the structure having the sound path needs to weaken breath and wind in the sound path to reduce the amount of wind or the like reaching the microphone. For this reason, the width, height, and length of the wind path are respectively set to about 2.5 mm, 0.5 mm, and 25 mm. Especially the length must be set to 25 mm or more. This structure is not therefore suited for a reduction in size, either.

A pressure gradient microphone such as a directional or close-talking microphone is susceptible to the influence of wind, in particular, as compared with a non-directional microphone. It is therefore difficult to apply such a microphone to a portable telephone, a video camera, and the like which are used outdoors.

SUMMARY OF THE INVENTION

The present invention has been made to solve the above problem, and has as its object to provide a transmitter structure which uses one microphone but does not require a circuit for reducing wind noise and the like.

It is another object of the present invention to provide a transmitter structure which allows a reduction in size and can reduce wind noise and the like.

In order to achieve the above objects, according to the present invention, there is provided a transmitter structure comprising a microphone, a first sound hole formed in a case on a front side of the microphone, a first slit for connecting the microphone to the sound hole, and a first acoustic resistance cloth which fills the slit.

The slit preferably has a width of 2.5 mm, a height of 0.3 mm, and a length of 10 mm.

The structure may further include a second sound hole formed in the case on a rear side of the microphone, a second slit for connecting the second sound hole to the rear side of the microphone, and a second acoustic resistance cloth which fills the second slit.

When the microphone is a pressure gradient microphone such as a directional or close-talking microphone, the present invention exhibits its effect.

As described above, in the transmitter structure of the present invention, the slit filled with the acoustic resistance cloth serves as a wind screen to reduce wind noise and the like.

Since the acoustic resistance is proportional to the thickness and length of the acoustic resistance cloth, a compact structure can be realized.

In addition, when arrangements similar to the above arrangement are formed on the front and read sides of a pressure gradient microphone, a structure resistance to wind noise can be provided.

According to the present invention, since the wind noise reducing effect can be obtained by the slit formed on the front side of the microphone and filled with the acoustic resistance cloth, no special circuit for reducing wind noise is required, realizing a reduction in cost.

In addition, since the thin acoustic resistance cloth is used for the relatively short slit, a compact structure can be realized.

Furthermore, since the acoustic resistance cloths are used for the sound holes formed on the front and read sides of the microphone, a directional or close-talking microphone which is resistant to wind noise can be realized.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

The present invention will be described in detail below with reference to the accompanying drawings.

Figure 1:
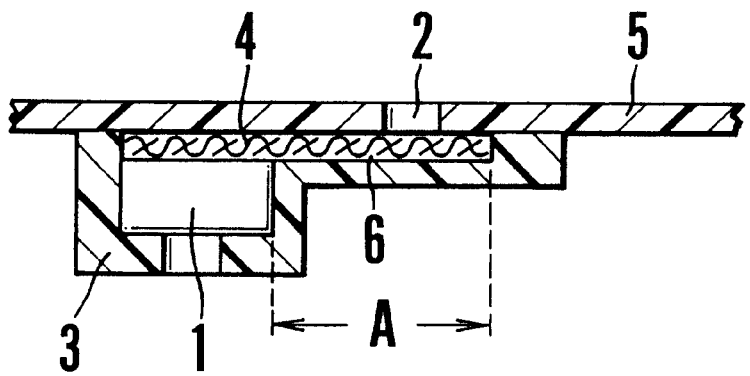
FIG. 1 is a sectional view showing an embodiment of the present invention.

FIG. 1 is a sectional view showing an embodiment of the present invention.

Referring to FIG. 1, a transmitter structure comprises a microphone 1, a sound hole 2, a microphone holder 3, an acoustic resistance cloth 4, a case 5, and a slit 6.

The sound hole 2 is formed in a portion of the case 5. The sound hole 2 is connected to the front portion of the microphone 1 through the slit 6 formed in the microphone holder 3 supporting the microphone 1. The front portion is located on the right side in FIG. 1. The microphone 1 is therefore spaced apart from the sound hole 2 through the slit 6, i.e., located at an offset position. The microphone holder 3 is fixed to the case 5.

This slit 6 may extend from the position of the sound hole 2, or may extend from a portion closer to the front side than the sound hole 2 to the microphone 1. The front side is located on the right side in FIG. 1.

The slit 6 is filled with a damping cloth or acoustic resistance cloth 4 which has the property of transmitting sounds but does not allow dust and the like to pass through it. The acoustic resistance cloth 4 may fill only the slit 6 or may extend to the front portion of the microphone 1.

The slit 6 preferably has a width of about 2.5 mm, a height of about 0.3 mm, and a length of about 10 mm. In this case, "a length of about 10 mm" corresponds to a portion A between the distal end portion of the microphone 1 and an end portion of the slit 6. The acoustic resistance cloth 4 preferably has a thickness of about 0.3 to 0.5 mm.

The operation of the present invention will be described next.

Wind, breath, or the like entering the sound hole 2 reaches the diaphragm at the front portion of the microphone 1 through the slit 6. The acoustic resistance cloth 4 filling the slit 6 serves as a wind screen for blocking the wind or the like entering the sound hole 2. The function of the wind screen increases in effect as the acoustic resistance increases. The effect therefore increases as the thickness of the acoustic resistance cloth 4 increases. In the present invention, since the acoustic resistance effect is based on the thickness and length of the acoustic resistance cloth, a compact structure can be realized.

In addition, since no air chamber or the like is required in the slit 6, the disturbances in frequency characteristics due to acoustic capacitance are small.

Figure 2:
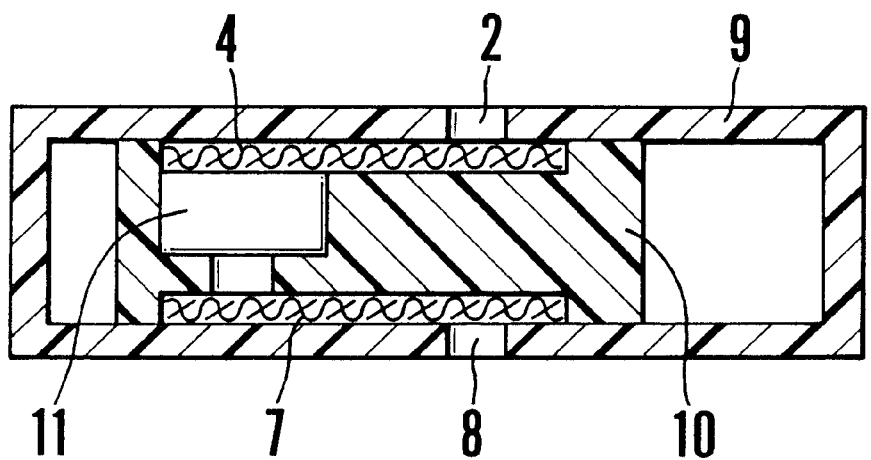
FIG. 2 is a sectional view showing another embodiment of the present invention.

FIG. 2 is a sectional view showing another embodiment of the present invention.

Referring to FIG. 2, a transmitter structure comprises sound holes 2 and 8, acoustic resistance cloths 4 and 7, a case 9, a microphone holder 10, and a microphone 11.

The microphone 11 is a pressure gradient microphone such as a directional or close-talking microphone. In this case, in addition to the sound hole 2 on the microphone front side, the sound hole 8 is formed on the microphone rear side. The microphone 11 of this type is a differential microphone which operates on the basis of the difference between sounds from the front and rear sides of the microphone 11.

The sound holes 2 and 8 are formed in the case 9 to oppose each other on the front and rear sides (the front and rear sides are respectively located on the right and left sides in FIG. 2) of the microphone 11. Slits filled with the acoustic resistance cloths 4 and 7 are formed in the microphone holder 10 to extend from the sound holes 2 and 8 to the microphone 11.

In this embodiment, similar to the first embodiment, the acoustic resistance cloths 4 and 7 serve as wind screens to block wind and the like entering the sound holes 2 and 8. For this reason, a pressure gradient microphone which is susceptible to the influence of wind, in particular, can be reduced in size.

Figure 3:
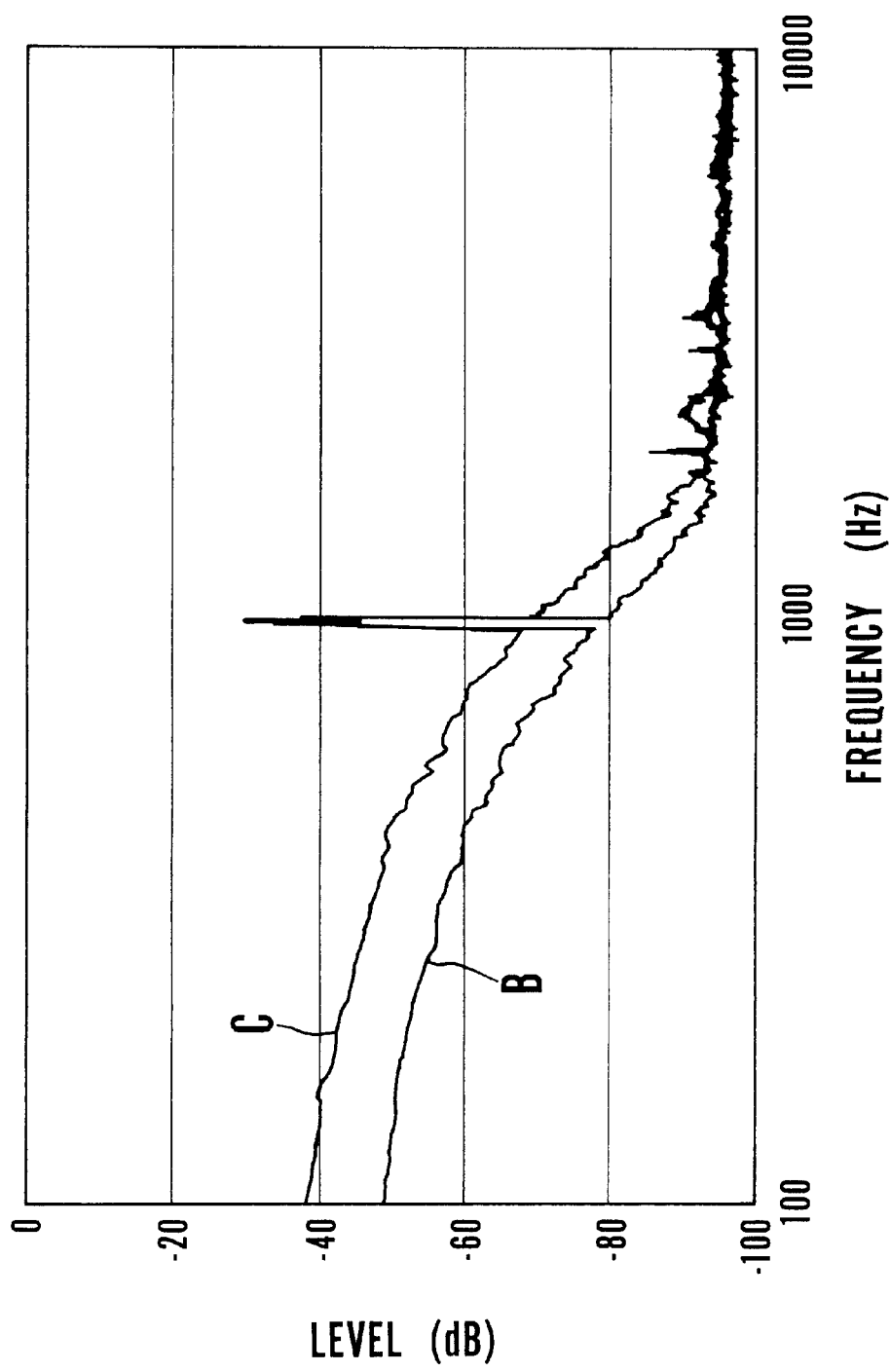
FIG. 3 is a graph showing the frequency characteristics of the embodiment shown in FIG. 2.

FIG. 3 is a graph showing the frequency characteristics based on wind noise in the embodiment shown in FIG. 2.

FIG. 3 shows the frequency characteristics obtained with a 1-kHz single sound and wind generated by a fan using a close-talking microphone as the microphone 11, in comparison with a conventional structure having no slit. Each slit has a width of 2.5 mm, a height of 0.3 mm, and a length of 10 mm. Referring to FIG. 3, a curve B represents the embodiment of the present invention, and a curve C represents the prior art.

As is apparent from FIG. 3, a wind noise reduction effect of about 10 dB is obtained at 2 kHz or lower.

What is claimed is:

1. A transmitter structure comprising:

a microphone;

a case having at least one first sound hole formed therein on a front side of said microphone and offset from said microphone such that none of the sound holes or portions thereof are in direct communication with the microphone;

a microphone holder disposed within the case and having a support for supporting the microphone therein, the microphone holder further having a first interior channel acoustically connecting said front side of said microphone to said at least one first sound hole; and a first acoustic resistance cloth which fills the first interior channel.

2. A structure according to claim 1, wherein the first interior channel has a width of 2.5 mm, a height of 0.3 mm, and a length of 10 mm.

3. A structure according to claim 1, further comprising at least one second sound hole formed in said case on a rear side of said microphone wherein said holder further having a second interior channel acoustically connecting said at least one second sound hole to the rear side of said microphone, and a second acoustic resistance cloth which fills said second interior channel.

4. A structure according to claim 3, wherein said microphone is a pressure gradient microphone including a directional microphone and a close-talking microphone.

* * * * *